United States Patent [19]
DuFrene

[11] Patent Number: 4,539,920
[45] Date of Patent: Sep. 10, 1985

[54] TRANSPLANTERS

[75] Inventor: Clement O. DuFrene, Cottage Grove, Minn.

[73] Assignee: Gordon Rosenmeier, Little Falls, Minn. ; a part interest

[21] Appl. No.: 537,249

[22] Filed: Sep. 28, 1983

Related U.S. Application Data

[63] Continuation-in-part of Ser. No. 526,965, Aug. 26, 1983.

[51] Int. Cl.³ .............................................. A01G 23/06
[52] U.S. Cl. ......................................................... 111/2
[58] Field of Search ..................... 47/76; 111/2, 7.1, 4; 37/2

[56] References Cited

U.S. PATENT DOCUMENTS

| | | | |
|---|---|---|---|
| 69,642 | 10/1867 | Disbrow | 294/50.7 X |
| 442,184 | 12/1890 | Harpold | 111/4 X |
| 522,039 | 6/1894 | Baldridge | 294/50.7 X |
| 541,841 | 7/1895 | Doyle | 111/4 X |
| 969,701 | 9/1910 | Jaynes | 294/50.7 X |
| 1,129,924 | 3/1915 | von Hassel | 294/50.7 |
| 2,313,604 | 3/1943 | Vogel | 37/2 |
| 2,740,234 | 4/1956 | Van Norman | 37/2 |
| 2,769,278 | 11/1956 | Wassell et al. | 47/76 X |
| 3,191,982 | 6/1965 | Goalard | 294/70 |
| 3,460,277 | 8/1969 | Grover et al. | 111/2 X |
| 4,341,025 | 7/1982 | Stocker | 37/2 |

FOREIGN PATENT DOCUMENTS 308825  8/1955  Switzerland ............................ 111/2

*Primary Examiner*—Robert A. Hafer
*Assistant Examiner*—Danton DeMille
*Attorney, Agent, or Firm*—Robert C. Baker

[57] ABSTRACT

The transplanter comprises plural spade members, each having an imaginary axis line along which the blade and shaft thereof extend, and a mainframe for holding and guiding each spade member for a line of travel by the blade and shaft thereof in a direction substantially along its axis line. The mainframe includes a generally horseshoe-shaped base member having the arms thereof horizontally oriented for resting upon the surface of the earth, with the stem of a plant or tree receivable therewithin. Base guide slots are located in the base member for guiding the travel by the blades of the spade members. Upper guide slots are carried by the mainframe for guiding the travel by the shafts of the spade members. The upper guide slots and the base guide slots are so oriented that the line of travel for each spade member is maintained in an angular relationship with respect to the base member, with the lines of travel substantially intersecting at a point below the mainframe.

20 Claims, 5 Drawing Figures

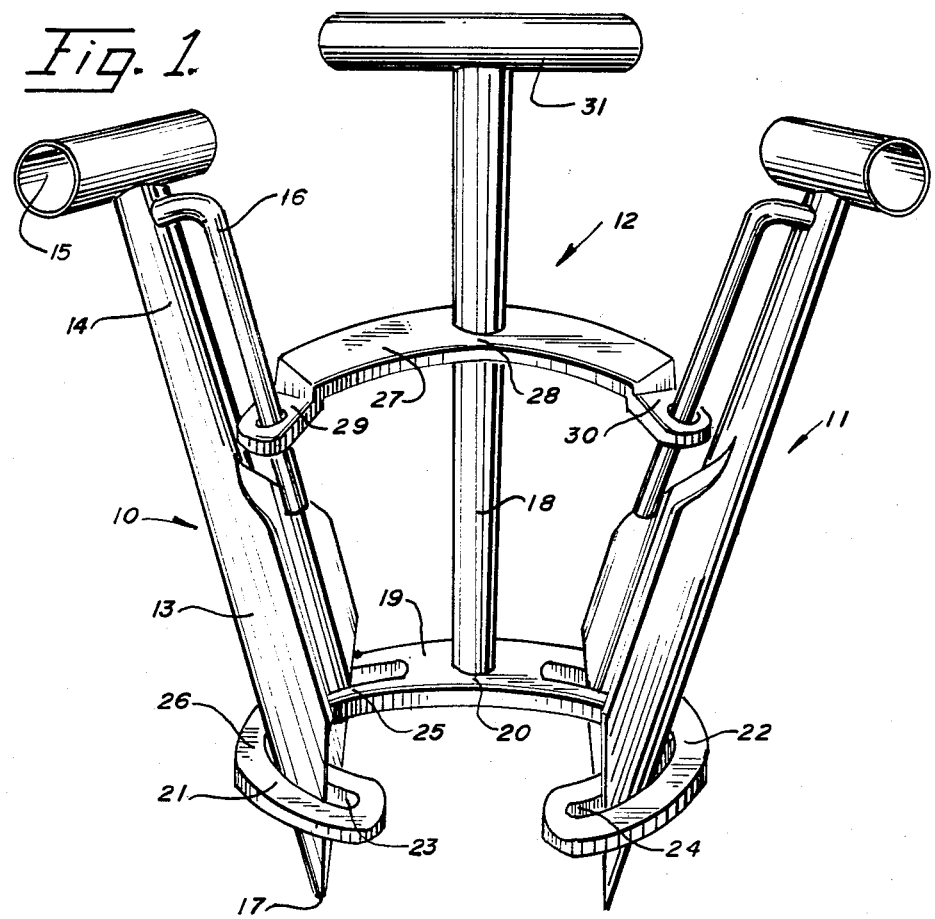
Fig. 1.
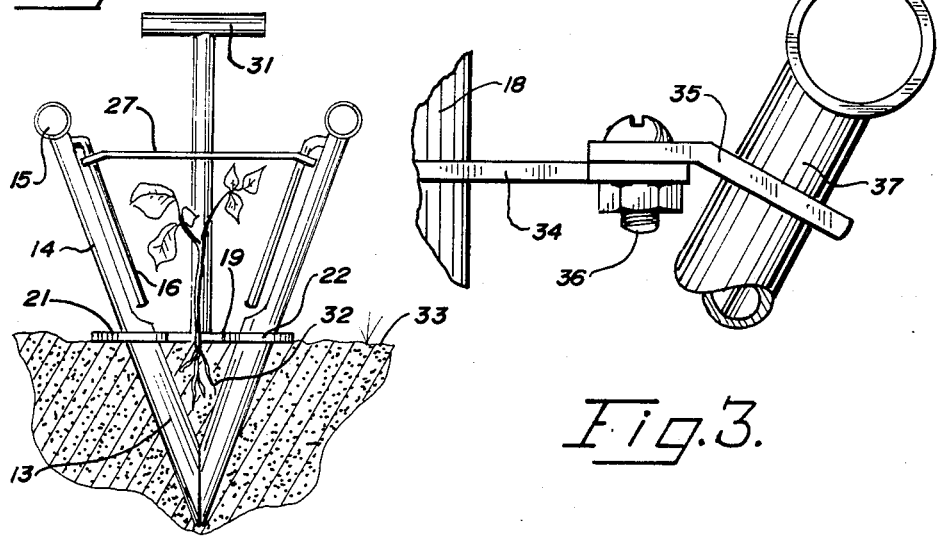
Fig. 2.
Fig. 3.

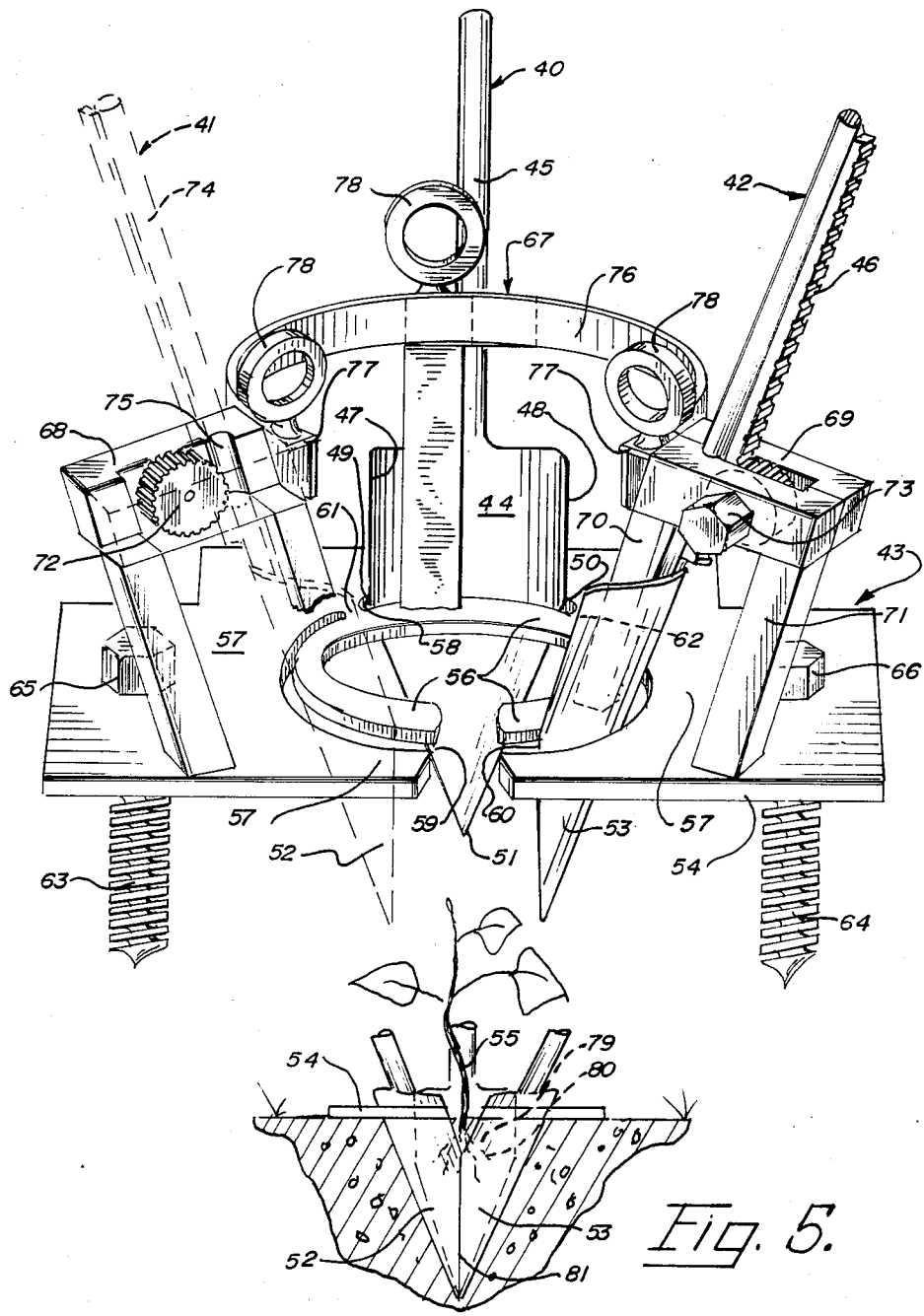

TRANSPLANTERS

CROSS REFERENCE TO RELATED APPLICATION

This application in a continuation-in-part of my application Ser. No. 526,965, filed Aug. 26, 1983.

BACKGROUND OF THE INVENTION

This invention relates to transplanters useful in transplanting living plants or trees. Encompassed by the invention are transplanters of relatively small type useful for transplanting seedlings of various types including small shrubs and trees as well as vegetable plants and flowers and the like. The principles of the invention also apply to larger but yet extremely simplified transplanters useful for handling the transplanting of larger plants or trees (all characterized herein as plants), including those of such weight as to require power assistance for lifting and movement.

A variety of transplanters of the generally simplified type to which this invention is directed, that is, those capable of being used by the average person, have heretofore been proposed by those working in the art; but none is known to have the features and attributes of the transplanter teachings of this invention.

The new transplanters are conveniently employed to dig the hole in the ground where a plant is to be transplanted. The act of digqing the hole using a transplanter of the invention is quickly accomplished and leaves a cone-shaped hole for the transplant. Thereafter, a plant or tree to be transferred using the same transplanter is lifted out of the ground with a conical body of the earth from its present growing site about its roots without disturbing the relationship of that earth to the roots. The transplanter conveniently is then employed as the carrier for moving the plant with the body of earth about its roots to the new location. It is then inserted into the new location with the conical body of earth about its roots resting in the conical hole previously formed. Thus it is that the plant root system is subjected to minimal disturbance in the process of transplanting; and, most importantly, the whole process is exceedingly quickly and conveniently accomplished. In essence, practice of the invention permits transplanting without the necessity of one's hands touching the earth at any time.

SUMMARY OF THE INVENTION

A transplanter according to the invention comprises plural spade members and a mainframe. Each spade member has an imaginary axis line along which the blade and shaft of the spade member extend. The mainframe is for holding and guiding each spade member for a line of travel by the blade and shaft thereof in a direction substantially along the axis line thereof. The mainframe includes a generally horseshoe-shaped base member having the arms of the horseshoe shape horizontally oriented for resting upon the surface of the earth. The arms are adapted to receive therewithin the stem of a plant or tree to be transplanted. Base guide means are incorporated in the base member for guiding the travel by the blades of the spade members. Upper guide means are carried by the mainframe for guiding the travel by the shafts of the spade members. The upper guide means and the base guide means are so oriented that the line of travel for each spade member is maintained in an angular relationship with respect to the base member, with the lines of travel substantially intersecting at a point below the mainframe.

The blades of the spade members are preferably curved with the center line of the arc of curvature lying substantially in the axis line of the spade member. Further, the lateral edges of the blades are preferably substantially parallel and the terminal edge tapers from the lateral edges toward the terminus or very end of the blade. The tapered terminal edges are such that the blades of the transplanter substantially mate along their tapered terminal edges to form a cone or a conical relationship when the spade members are at the lower end of their lines of travel.

The transplanter may be of a size conveniently hand carried, with handgrip members provided for hand-effected operation of it, or it may be somewhat larger and incorporate means for facilitating the application of power to effect movement of the spade members along their lines of travel. It may incorporate anchoring means as well as means for receiving attachment of lifting means thereto to facilitate transport of the device to different locations.

Several other features, relationships, and benefits of the invention will become evident as this description proceeds.

BRIEF DESCRIPTION OF DRAWINGS

FIG. 1 is a schematic perspective view of the preferred form for a small transplanter of the invention;

FIG. 2 is a schematic side plan view of the transplanter of FIG. 1 with the spade members shown in depressed condition into the earth about the root system of a plant;

FIG. 3 is a schematic side plan view of a fragmentary portion of a transplanter of the invention, illustrating a further arrangement of elements for guiding the shaft portion of a spade member;

FIG. 4 is a schematic perspective view, with some parts partially broken away and some in phantom, of a preferred form for a larger-sized transplanter of the invention, with the spade members illustrated in elevated condition; and FIG. 5 is a fragmentary schematic side view of the transplanter of FIG. 4, showing the cone relationship of the spade members at their lowermost position of travel.

DESCRIPTION OF PREFERRED EMBODIMENTS

Referring to FIG. 1, the transplanter structural elements there illustrated comprise two spade members generally indicated by arrows from reference characters 10 and 11, and a mainframe generally indicated by the arrow from reference character 12.

Since both spade members, also called trowel members, are suitably identical in form, the trowel 10 will be taken as illustrative. A curved blade 13 forms the lowermost portion. The straight center line for its arc of curvature is located at its rear and lies in the axis line of the trowel member. The axis line is an imaginary line along the shaft 14 of the trowel member; and thus the shaft 14 itself lies or substantially lies in the axis line of the trowel member. The shaft 14 is fixed to the heel of the blade 13; and the heel is located in or substantially in the noted axis line.

To be recognized is that the term "axis line" as used herein is not to be interpreted as implying any rotation. The designation "axis line" is simply to stress the preferred orientation of spade or trowel elements and to give a convenient point of reference for the line of travel taken by them as they are employed according to the invention.

A hand grip or handle 15 at the upper end of shaft 14 provides a convenient means for hand sliding of the trowel 10 along its axis line of travel. Proximate to but preferably spaced slightly from shaft 14 is a rod 16, fixed at its upper end to the upper end of the shaft 14 and extending parallel to shaft 14. The blades 13 of preferred spades or trowels terminate more or less in a rounded tip or point end 17. More will be said hereinafter about preferred detail for the blades.

The mainframe of FIGS. 1 and 2 has a vertically extending shank member 18 which serves as the mounting post for all elements of the mainframe.

At the lower end of the mainframe is fixed a U-shaped member appropriately characterized as a horseshoe-shaped base member 19. This base member may be in the nature of a plate. It is fixed at its crown portion 20 to the shank 18. The arms 21 and 22 of the base member 20 extend horizontally, that is in a direction transversely out from the shank member, and are adapted to flank or receive therewithin the stem of a plant to be transplanted. They also function as members which may be used to tamp or pack earth about the stem of a plant during transplanting.

Each arm 21 and 22 contains an arcuate opening or slot, respectively numbered 23 and 24 in FIG. 1. The arc of these slots is such as to accommodate the arc of curvature of the curved blades of the trowel members. Significantly, the intrados strip 25 or portion at the interior of an arcuate slot in the base plate functions on upward movement of a trowel member out of the earth to scrape earth from the interior of the curved blade 13; and in this manner and for this reason the conical earth about the main root system of a plant undergoing transplanting is maintained in a relatively undisturbed condition on withdrawal of trowel members. The extrados strip or section 26 of an arcuate slot (such as arcuate slot 23) also performs a significant function in that it scrapes earth from the rear or back surface of the blade of a trowel member and assists in keeping earth at the outside portion of a cone hole in position at the time of withdrawal of a trowel member. Still further, the intrados 25 and extrados 26 strips or sections on opposite sides of an arcuate slot provide positive guide surfaces for reliable travel movement of the trowel members restricted to that along their axial direction.

A further generally U-shaped member is affixed to the shank 18 of the mainframe; and this further member is an upper frame or U-shaped plate 27. It is fixed at its crown or vertex 28 to the shank 18 at an upper location along the shank so as to place it in spaced relationship above the lower or base plate. The arms 29 and 30 of the upper plate extend transversely out from the shank 18 above the arms of the base plate 19. Importantly, arm 29 extends from the shank 18 in a manner placing it relatively above arm 21 of the base plate; and arm 30 of the upper plate extends outwardly from shank 18 to a location relatively above arm 22 of the base plate. At the uppermost end of the shank 18 is preferably fixed a handle or hand grip 31 by which the entire transplanter may be hand carried.

In FIG. 2, the transplanter of FIG. 1 is shown with its trowel members pressed into the earth and with the tip portions (including the entire terminal edge portions) of the curved blades of the trowel members in the preferred substantially proximate or contacting relationship about a cone of earth surrounding the main root system 32 of a plant to be transplanted. To be observed is that the base plate 19 rests upon the surface of the ground 33. Thus it is that the generally horseshoe-shaped base plate serves as a leveling and stabilizing member during use of the transplanter, stabilizing the entire mainframe which in turn stabilizes the trowel members which are essentially limited in movement to that along the axial direction thereof.

In FIG. 3. an alternate means for guiding the shaft 14 portion of trowel members for movement along an axial line of their structure is illustrated. The shank 18 in FIG. 3 is equipped with a U-shaped member 34 having the terminus of its arms in the form of an ear flange 35 fixed to the main arm body by any suitable means such as a nut and bolt 36. The terminal ear flange 35 is provided with a hole through which the shaft 37 of a trowel member extends and is hand slidable along its axis by gripping handle 38 to effect such action. A still further modification may be that of placing a dovetail notch in the terminus of arms 29 and 30 and a mating dovetail body along the shaft of a trowel. Such an arrangement or that of FIGS. 1 and 2 is generally preferred from the standpoint of manufacture, shipment in unassembled condition, and assembly by users.

In essence, three parts form the entire transplanter illustrated particularly in FIGS. 1 and 2, namely the two trowel member assemblies and the mainframe. The user on receiving a package containing those three parts is able to quickly assemble them in the manner illustrated for immediate transplanting operations.

The embodiment illustrated in FIGS. 4 and 5 incorporates three spade members generally indicated by the arrows from reference characters 40, 41, and 42, plus a mainframe generally indicated by the arrow from reference character 43. Spade 41 is shown in phantom in FIG. 4 to permit better illustration of mainframe details.

While three spade members are illustrated, more may be employed; but the operations are successfully conducted with three and therefore the use of four or more is considered unnecessary. Further, while indentical spade members as illustrated are preferred, a combination employing different sizes (e.g., a single smaller spade and two of equal larger size) may be employed with substantially equivalent results.

Spade member 40 is representative and comprises a blade 44 and a shaft 45. The blade and shaft lie along an imaginary axis line as aforediscussed for the embodiment of FIGS. 1 and 2. The axis line lies along the rear portion of the shaft 45, where a toothed rack (see rack 46 for spade 42) is located; the axis line extends down the center line of the rear of each blade. The blade 44 is transversely curved; and the straight center line for the arc of curvature lies substantially in the axis line of the spade member. It is but a continuation of the axis line of the shaft 45. Each spade travels in a line substantially coincident with its axis line as the transplanter is operated; and the lines of travel intersect at a point below the mainframe 43.

Preferred blades for the spade members of all transplanters of the invention have lateral edges which are substantially parallel and also are substantially parallel to the axis line of the spade member. These lateral edges are marked 47 and 48 for spade 40. Further, there are some special preferred features for the entire terminal edge portion of the spade members. The entire terminal edge portion is that portion which extends from the lowermost ends or points 49 and 50 of the parallel lateral edges 47 and 48 down to the very terminus 51 of the blade. The terminus 51 generally is in the form of a relatively rounded or curved point, although a sharp point may be used. Further, the very edge along the entire terminal edge (i.e., from point 49 to 51 to 50) is preferably a cutting edge. Cutting edges more readily penetrate earth and sever any outlying roots. The entire terminal edge, while appearing in the drawing to be relatively "straight", may be somewhat curved. The fundamental principle is that the blades of all transplanters of the invention have terminal edges which taper toward the terminus thereof in a manner such that the blades substantially mate along their terminal edges to form a cone when the spade members are at the lower end of their lines of travel (see FIGS. 2 and 5, particularly 5). Specifically, the side portion (e.g., side half from point 49 to point 51) of the terminal edge of one blade mates or meets with the side portion of the terminal edge of the blade nearest thereto (e.g., adjacent thereto) when the blades are at the lower end of their line of travel. The terminal edges of all blades (e.g., blades 44, 52, and 53 in FIGS. 4 and 5) cooperate together at their lower end of travel to form a cone into the earth, with the apex of the cone lowermost. This cone feature or substantially conical feature also is convenient as a reference feature for describing the lines of travel taken by the spade members in operation of the transplanter in that the lines of travel are substantially straight and lie more or less in the conical wall from an upper circumferential point downward to the apex.

The mainframe illustrated in FIG. 4 comprises a generally horseshoe-shaped base member 54 having the arms thereof horizontally oriented for the functional reasons aforenoted. Base member 54 has an intrados strip 56 located proximate to the front surface of the blades of the spade members, and an extrados strip 57 located proximate to the back surface of the blades of the spade members. These strips function as aforedescribed.

Arcuate slot means such as arcuate slots 58, 59, and 60 are between the extrados and intrados strips and are defined by those strips. Through the arcuate slot means the blades of the spade members extend and are guided in travel. As illustrated, part of the metal structure of the horseshoe-shaped base member 54 may and preferably does extend as a body portion 61 and 62 between the extrados and intrados of the horseshoe-shaped base. This feature adds strength and also contributes to guiding the blades in their travel, particularly guiding the parallel side edges. However, the arcuate slots 59 and 60 preferably do not have any portion of the horseshoe-shaped base member extending between the extrados and intrados at the arm ends of the horseshoe base 54. (The opening at the arm ends of base 54 forms the entrance for the stem 55, illustrated in FIG. 5, of a plant or tree.) These slots 59 and 60 extend from the opening at the arm ends into the arms. The slots and blades of the spades are comparably curved, which enhances the guiding characteristics of the slots 58, 59, and 60. The horseshoe base, at its outer perimeter, may bear little resemblance to a horseshoe per se, and may be made relatively thick or provided with a rigidifying perimeter frame of metal.

Anchoring means in the nature of augers 63 and 64, carried by the base 54, are illustrated at locations laterally outward from the lines of travel for the blades of the spade members. The augers are rotated or screwed into the earth by applying a suitable wrench or power tool for turning their hex knobs 65 and 66.

Upper guide means for guiding the travel by the shafts of the spade members may be incorporated in or as a part of boxes or blocks 67, 68, and 69. Each box is supported at an elevated location spaced above the horseshoe-shaped base member 54. Illustratively, the box 69 is supported by leg member 70 extending between box 69 to the intrados strip 56, and by leg 71 extending between the extrados strip 57 and box 69. While vertically oriented, these legs suitably, as illustrated, are substantially parallel to the axis lines of travel taken by the spade member.

Within each box 67, 68, and 69 is a pinion such as illustrated at 72. The pinions are mounted for cooperative action with the racks (such as rack 46) on the spade shafts to effect shift of the spade members along their lines of travel. The pinions may be turned by any suitable means, for example by applying a wrench to a hex knob 73.

The shafts of the spade members (phantom shaft 74 being illustrative) are within a hole or opening in boxes 67, 68, and 69 (e.g., the hole 75 in broken away box 68) so as to be slidable therethrough and therefore guided in travel by the hole as the upper guide means. If desired, assistance for sliding motion may be provided by roller bearings or the like; but such additional features are unnecessary. Other structural relationships between spade shafts and upper guide means may be employed.

Importantly, the upper guide means and the base guide means cooperate together and are so oriented that the line of travel for each spade member is always maintained at an angular relationship with respect to the horizontal horseshoe member. That angular relationship (from horizontal) is between about 55° and 70°, preferably about 65°. From the vertical (or a line perpendicular to the horizontal horseshoe base member), it is between about 20° and 35°, preferably about 25°.

The mainframe 43 of FIGS. 4 and 5, optionally but preferably includes a generally U-shaped upper frame member such as metal band 76 oriented in the horizontal direction, with the arms thereof above the respective arms of the base member 54 and functioning as bracing means for the upper guide means in boxes 67, 68, and 69. It suitably is welded to those boxes or to leg supports for them. A connecting plate 77 suitably welded to both the band 76 and a structure of the boxes provides an excellent location for the mounting of lift rings 78. These rings constitute means for receiving the attachment of a lifting means thereto. For example, chains extending from a hoist mounted on the bed of a truck may be hooked to the lifting rings so that the power of the hoist may be employed to lift the entire transplanter as well as a plant or tree and the conical body of earth 79 (see FIG. 5) about the nucleus 80 of its root system. The conical body of earth is formed by the blades which meet as at 81 (FIG. 5) along their tapered terminal edges.

Some deviation from the basic features and relationships discussed is permissible without departing from the essential principles. Further, other means than a rack and pinion may be employed for facilitating the application of power to effect movement of the spade members along their lines of travel. For example, hydraulic means such as hydraulic cylinders may be employed for that purpose. Pawl assemblies may be employed. In most arrangements, the characteristics of such power-assisted means are such that some sort of mechanical means (such as a rack or piston) is affixed to a shaft of a spade member for facilitating the application of power or force to effect movement of the spade member along its line of travel; and the mainframe then includes an actuatable means (a hydraulic cylinder or pinion or pawl assembly or the like) cooperative with the mechanical means on the shaft of the spade members for effecting incremental movement of the spade members along their lines of travel. In transplanters of smaller size for seedlings, means for facilitating the application of force to move the spade members may be less sophisticated, and may consist of spades designed to be pressed into the earth by one's foot.

Thus, insubstantial modifications of specific features illustrated may readily be made without departing from the essential scope and spirit of the invention. In this respect, the claims are to be construed with the understanding that the recitations therein are met by substantial compliance therewith, and the breadth of interpretation and equivalents are intended to be as broad as consistent with validity.

That which is claimed is:

1. A transplanter comprising plural spade members, each having a blade and a shaft extending above and attached to the top portion of the blade, each having an imaginary axis line along which the blade and shaft of the spade member extend, each said blade being curved with the center line of the arc of curvature lying substantiqlly in said axis line of said spade member, each said blade having substantially parallel lateral edges and a terminal edge tapering from said lateral edges toward the terminus of said blade, and a mainframe including a generally horseshoe-shaped base member having the arms of said horseshoe shape horizontally oriented for resting upon the surface of the earth, said arms being adapted fo receive therewithin the stem of a plant to be transplanted, base guide means consisting of arcuate slots in said base member for guiding the travel by the blades of said spade members, each said spade member being movable to effect slidable travel of its blade through a single said arcuate slot as an independent and separate matter from the movement of any other said spade member through any of the other of said arcuate slots, and upper guide means carried by said mainframe for guiding the travel by the shafts of said spade members, said upper guide means and said base guide means being in fixed spaced apart relationship to each other, said mainframe including a generally U-shaped upper frame member having arms in horizontal orientation above the respective arms of said base member, said upper frame member including a discreet said upper guide means for each spade shaft to guide the travel of the spade through a corresponding slot in the base member, whereby said spade members are held and guided by the upper guide means to pass through the slots in the base member along a line of travel in a direction substantially along the axis line of the spade members, with said lines of travel of said spade members intersecting at a point below the mainframe.

2. The transplanter of claim 1 wherein said blades of said spade members substantially mate along their terminal edges to form a cone at a location below said base member when said spade members are at the lower end of their said lines of travel where at least a portion of their parallel lateral edges extend through said arcuate slots to a location below said base member.

3. The transplanter of claim 1 wherein each outer portion of a said arcuate slot in said base member is defined by an extrados strip lying proximate to the back surface of the blade of a said spade member.

4. The transplanter of claim 1 wherein each outer portion of a said arcuate slot in said base member is defined by an intrados strip lying proximate to the front surface of the blade of a said spade member.

5. The transplanter of claim 1 wherein said plural spade members consist of two spade members in diametrically oriented relationship.

6. The transplanter of claim 1 wherein said plural spade members consist of three spade members in a triangular relationship.

7. The transplanter of claim 1 wherein said upper guide means comprises means through which the shafts of said spade members slidably travel longitudinally.

8. The transplanter of claim 1 wherein said spade members additionally comprise a rod member fixed proximate and parallel to the shaft member thereof, and wherein said upper guide means comprises means through which said rod extends and is slidable longitudinally.

9. The transplanter of claim 1 wherein said mainframe additionally comprises means extending from said base member for supporting said upper guide means.

10. The transplanter of claim 1 wherein said mainframe additionally comprises a generally vertically extending shank member and wherein said horseshoe-shaped base member and said U-shaped upper frame member are both fixed at a crown portion thereof to said shank member.

11. The transplanter of claim 1 wherein said mainframe additionally comprises leg means between said upper guide means and said base member for bracing said upper guide means above said base member.

12. The transplanter of claim 1 wherein said mainframe additionally comprises means for anchoring said mainframe into the earth at locations laterally outward from the lines of travel by the blades of said spade members.

13. The transplanter of claim 1 wherein said spade members include a hand-grip member on the upper end of the shafts thereof.

14. The transplanter of claim 1 wherein said spade members additionally comprise mechanical means affixed to the shafts thereof for facilitating movement of said spade members along their lines of travel, and wherein said mainframe additionally comprises actuatable means cooperative with said mechanical means for effecting incremental movement of said spade members along said lines of travel.

15. The transplanter of claim 1 wherein said mainframe includes a hand-grip member for hand lifting of the transplanter.

16. The transplanter of claim 1 wherein said mainframe includes means for receiving attachment of lifting means thereto.

17. A transplanter consisting essentially of two trowel members, each having a blade and shaft and having the blade and shaft thereof extending along an imaginary axis line of the trowel member, each said blade being curved with the center of its arc of curvature lying in said imaginary axis line of the trowel member, and a mainframe for holding and guiding movement of said trowel members, said mainframe comprising a vertically extending shank member, a generally horseshoe-shaped base plate fixed at the crown thereof to the lower end of said shank member with the arms of said base plate extending transversely out from said shank member and adapted to receive therebetween the stem of a plant to be transplanted, a generally U-shaped upper plate fixed at the crown thereof to said shank member in spaced relationship above said base plate with the arms of said upper plate extending transversely out from said shank member above said arms of said base plate, said base plate and said upper plate being in an immovable fixed spaced relationship on said shank member, base guide means consisting of an arcuate slot in each said base plate arm, said arcuate slots being at an orientation diametrically opposite each other and functioning as guide members through which said trowel blades are slidable, and upper guide means in each said upper plate arm for guiding the movement of said trowel shaft, said base guide means and upper guide means being so located as to maintain said two trowel members in diametrically oriented relationship and guide the movement thereof along a line of travel substantially coincident with said axis line of the blade and shaft of the trowel member during transplanting operations, with said axis lines of travel intersecting at a point below said mainframe, each said trowel member being movable along its said axis line of travel independently of the other.

18. The transplanter of claim 17 wherein each said trowel member includes a rod fixed proximate and parallel to the shaft thereof, and wherein said guide means in each said upper plate arm includes a hole through which said rod extends and is slidable.

19. The transplanter of claim 17 wherein said guide means in each said upper plate arm includes a hole through which the shaft of a said trowel member extends and is longitudinally slidable.

20. The transplanter of claim 17 wherein each said trowel member includes a hand-grip member at the upper end of the shaft thereof.

* * * * *